United States Patent [19]
Ernst

[11] Patent Number: 4,912,856
[45] Date of Patent: Apr. 3, 1990

[54] POSITION MEASURING DEVICE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 205,452

[22] Filed: Jun. 10, 1988

[30] Foreign Application Priority Data

Jun. 11, 1987 [DE] Fed. Rep. of Germany ....... 3719409

[51] Int. Cl.$^4$ .............................................. G01B 11/04
[52] U.S. Cl. ......................................... 33/702; 33/707
[58] Field of Search ............. 33/125 R, 125 A, 125 C, 33/125 T, 700, 707, 706, 702, 710, 712

[56] References Cited

U.S. PATENT DOCUMENTS

| | | |
|---|---|---|
| 3,816,002 | 6/1974 | Wieg . |
| 4,060,903 | 12/1977 | Ernst . |
| 4,170,826 | 10/1979 | Holstein . |
| 4,320,578 | 3/1982 | Ernst . |
| 4,530,157 | 7/1985 | Nelle . |
| 4,549,354 | 10/1985 | Affa et al. ........................ 33/125 R |
| 4,554,741 | 11/1985 | Affa ................................... 33/125 C |
| 4,593,471 | 6/1986 | Nelle ................................. 33/125 R |
| 4,631,830 | 12/1986 | Rieder et al. ..................... 33/125 R |
| 4,776,098 | 10/1988 | Nelle ................................. 33/125 R |

FOREIGN PATENT DOCUMENTS

| | | |
|---|---|---|
| 2518745 | 6/1979 | Fed. Rep. of Germany . |
| 2853771 | 6/1980 | Fed. Rep. of Germany . |
| 2911047 | 10/1980 | Fed. Rep. of Germany . |
| 2712421 | 6/1982 | Fed. Rep. of Germany . |
| 3106701 | 12/1982 | Fed. Rep. of Germany . |
| 3243966 | 5/1984 | Fed. Rep. of Germany . |
| 3419527 | 11/1985 | Fed. Rep. of Germany . |

Primary Examiner—William A. Cuchlinski, Jr.
Assistant Examiner—Christopher W. Fulton
Attorney, Agent, or Firm—Toren, McGeady & Associates

[57] ABSTRACT

A position measuring device for measuring the relative positions of two objects, wherein the two objects are machine components of a processing or working machine or a measuring machine for tools. The graduation of a scale connected to the first object is scanned by a scanning unit connected to the second object. The scale is arranged on a scale carrier so as to be slightly displaceable in a measuring direction. The scale carrier is connected with both ends thereof to fastening elements which, in turn, are rigidly connected to the first object. When the scale, the scale carrier and the workpiece have different thermal expansion, the scale carrier is connected at least at one end thereof to the fastening element with a translatory degree of freedom in measuring direction. The scale is biased at least at one end thereof by a spring element. The spring element is connected to the translatory movable end of the scale carrier. The spring constant of the spring element is selected so that when temperature changes occur the relative change in length of the scale is equal to the relative change in length of the workpiece.

10 Claims, 4 Drawing Sheets

POSITION MEASURING DEVICE

BACKGROUND OF THE INVENTION

1. Field of the Invention

The present invention relates to a position measuring device for measuring the relative positions of two objects. The two objects to be measured are machine components of a processing or working machine or a measuring machine for tools in which the graduation of a scale connected to the first object is scanned by a scanning unit connected to the second object. The scale is arranged on a scale carrier so as to be slightly displaceable in measuring direction. The scale carrier is connected with both ends thereof to fastening elements which, in turn, are rigidly connected to the first object.

2. Description of the Prior Art

Position measuring devices of the above-described type are used particularly in processing machines for measuring the position of a tool relative to a workpiece to be processed as well as in machines for measuring coordinates for determining the position and/or dimensions of test objects.

Devices are already known in position measuring apparatuses for the compensation of errors, particularly errors in graduation of a scale, of machine errors of machine components and/or of temperature-related errors.

German patent No. 27 12 421 discloses an enclosed longitudinal measuring device in which a scale is longitudinally movably arranged on a scale carrier and is connected through fastening elements at both ends to a machine component to be measured. The fastening elements, in turn, are rigidly fastened to the machine component. While one end of the scale is connected directly to one of the fastening elements, the other end of the scale is connected through a spring-biased expanding device to the other fastening element in order to correct graduation errors and/or machine errors. The longitudinal measuring device according to German Offenlegungsschrift No. 29 11 047 has a compressing device in addition to an expanding device.

German patent No. 25 18 745 discloses an enclosed longitudinal measuring device whose housing is fastened at both ends thereof through an angle member each to a machine component in an articulated manner. A scale is longitudinally movably arranged in the housing and, for correcting graduation errors and/or machine errors, the scale is connected at both ends thereof to the angle members through a spring-biased expanding device or a spring-biased compressing device.

German patent No. 31 06 701 is directed to a device in a longitudinal measuring apparatus for machine tools in which, for the compensation of length changes of machine components due to temperature changes, an expansion rod of a material having a high coefficient of thermal expansion is connected with one end thereof to a machine component and with the other end thereof to a scale, wherein the thermal expansion of the expansion rod is equal to that of the machine component, so that the thermal expansion of the machine component is determined by the measuring device.

German Offenlegungsschrift No. 28 53 771 describes a longitudinal measuring device in which a housing for receiving a scale and a scanning device is connected at both ends thereof through fastening elements to a machine component to be measured. While one end of the housing is directly connected to a first fastening element, a length compensating element for the thermal compensation is arranged between the other end of the housing and the second fastening element. Thus, the latter end of the housing is supported with a translatory degree of freedom in longitudinal direction of the housing.

German Offenlegungsschrift No. 32 43 966 discloses a longitudinal measuring device in which a scale is arranged in the middle thereof on a rigid reference point and is otherwise arranged on a scale carrier so as to be slightly movable in measuring direction when temperature changes occur. The scale carrier is connected on both ends thereof through a length compensating element each to fastening elements which are rigidly fastened on a machine component to be measured. The middle of the scale carrier is fastened through an additional fastening element rigidly to the machine component, so that the scale maintains its fixed reference point relative to the machine component when temperature changes occur.

U.S. Pat. No. 3,816,002 describes a longitudinal measuring device with a housing for receiving a scale and a scanning device. One end of the housing is rigidly connected to a machine component and the other end of the housing is longitudinally movably connected to the machine component for the compensation of length changes due to temperature changes. The scale is fixed at one end thereof within the housing and is connected with the other end thereof through a tensioning device to the housing. Due to the spring-biased tensioning device, the scale is not influenced by temperature-related length changes of the housing.

The compensation of temperature-related errors is necessary because generally a constant temperature does not exist in spaces which house processing machines on which the above-described position-measuring devices are used. In addition, the temperatures of the individual processing machines continuously rise during the duration of workpiece processing. Since, for cost reasons, rarely the machine part to be measured, the scale as well as the scale carrier will be of materials having the same thermal expansion coefficient $\alpha$, the unavoidable temperature changes of the machine component, the scale and scale carrier result in different thermal length changes, so that measuring inaccuracies may occur during the processing of a workpiece. Such inaccuracies are not acceptable today because high demands are made of the accuracy of processing or workpieces. The material most frequently used for the machine component is gray cast iron ($\alpha(O) = (10.10^{-6} \mathrm{K}^{-1})$, while aluminum ($\alpha(G) = (23.10^{-6} \mathrm{K}^{-1})$ is used for the scale carrier and glass ($\alpha(M) = 8.10^{-6} \mathrm{K}^{-1}$) is used for the scale. In addition, the workpieces most frequently processed are of steel ($\alpha(W) = 11.10^{-6} \mathrm{K}^{-1}$).

German Offenlegungsschrift No. 34 19 527 describes a position measuring device used on a processing machine in which a bending-resistant scale of glass is arranged in a housing as a scale carrier so as to be movable in measuring direction. The housing is connected with one end thereof directly to a first fastening element and with the other end thereof through two calibrating screws to a second fastening element. The scale has a greater graduation length than the required intended graduation length and the two fastening elements act at the ends of the scale. The scale is compressed by means of the two calibrating screws through the two fastening elements at a normal temperature of 20° C. until the intended graduation length is reached. Since the machine component to be measured generally will not have this normal temperature when the position measuring device is mounted, the two calibrating screws are provided with temperature scales which make it possible to adjust the graduation length of the scale to the temperature of the machine component. After the two fastening elements have been rigidly fastened to the machine component, the two calibrating screws are released. Because of the compression of the scale, the scale and the machine component are subjected to the same thermal length changes when the temperature changes. This position measuring device is of relatively complicated construction and is not able to compensate thermally caused processing inaccuracies if the machine component and the workpiece to be processed are not composed of materials having the same thermal expansion coefficient $\alpha$.

It is, therefore, the primary object of the present invention to provide a position measuring device of the above-described type which can be mounted on a machine component without having to take the temperature conditions into consideration. In addition, thermally caused processing inaccuracies of the workpiece to be processed are to be avoided even when the scale and the workpiece have different expansion coefficients.

SUMMARY OF THE INVENTION

In accordance with the present invention, in a device of the above-described type in which the scale, the scale carrier and the workpiece have different thermal expansion, the scale carrier is connected at least at one end thereof to the fastening element with a translatory degree of freedom in measuring direction. The scale is biased at least at one end thereof by a spring element. The spring element is connected to the translatory movable end of the scale carrier. The spring constant of the spring element is selected so that when temperature changes occur the relative change in length of the scale is equal to the relative change in length of the workpiece.

The position measuring device according to the present invention has the particular advantage that the device can be mounted on a machine component at any temperature. Independently of the thermal expansion coefficient of the machine component, the effect of temperature changes of the scale can be adapted to the effect of temperature changes of the workpiece to be processed, so that the scale and the workpiece to be processed are subjected to the same relative length changes even when they have different thermal expansion coefficients. Accordingly, the proposed position measuring device makes it possible to practically exclude thermally caused processing inaccuracies, so that the reject trade can be substantially reduced.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
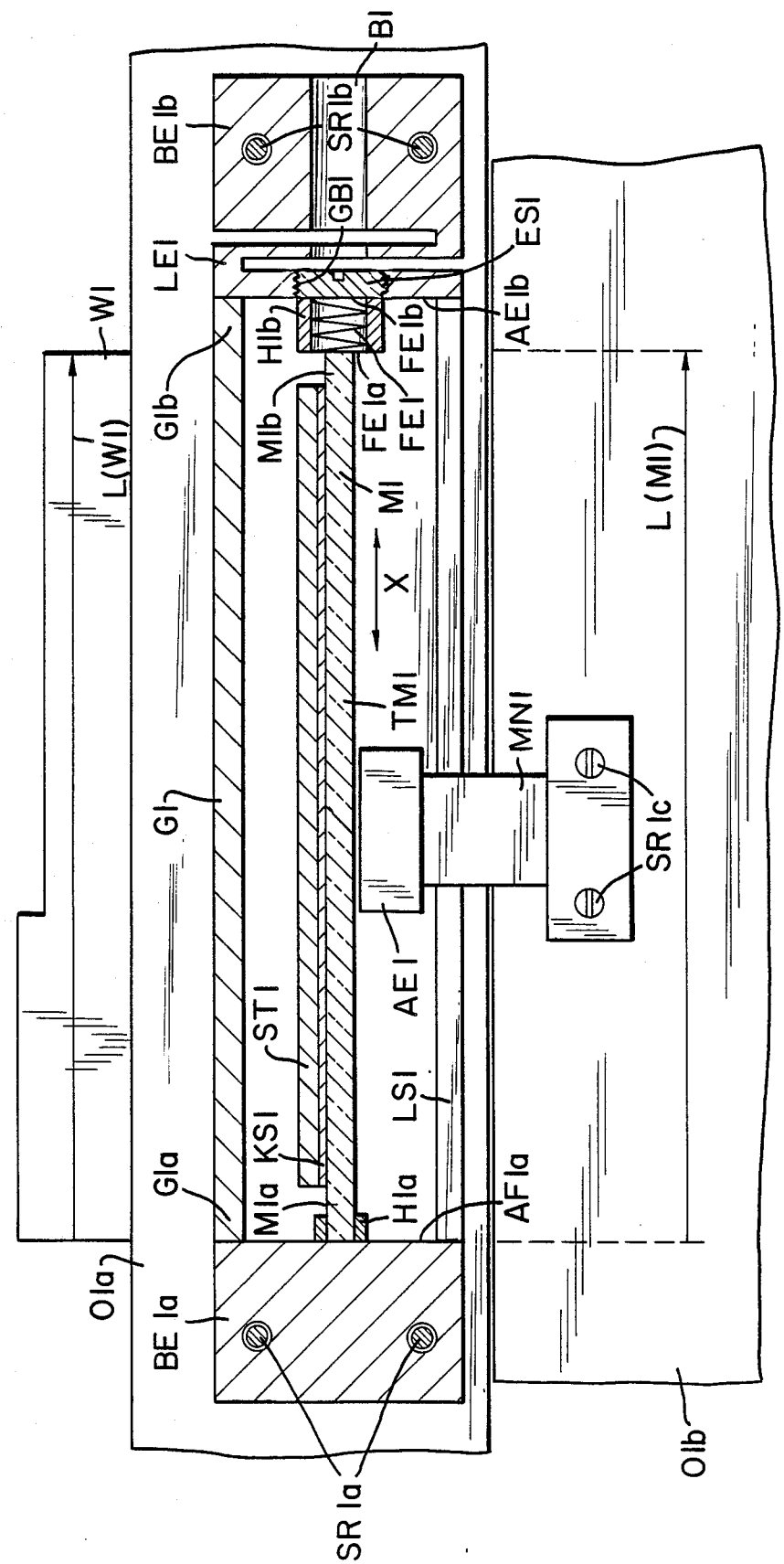
FIG. 1 is an elevational view, partly in section, of a first embodiment of an enclosed longitudinal measuring device according to the present invention.

FIG. 1 of the drawing shows a first enclosed longitudinal measuring device according to the present invention. A bending-resistant scale M1, for example, of glass, is mounted on an inner web ST1 of a scale carrier G1 so as to be slightly displaceable in measuring direction X by means of an adhesive layer KS1. The scale carrier G1 forms a housing, for example, of aluminum. The scale carrier G1 is connected at the first end G1a directly to a first fastening element BE1a and at the second end G1b to a second fastening element BE1b through a length compensating element LE1 with a translatory degree of freedom in measuring direction X. The two fastening elements BE1a, BE1b, in turn, are fastened rigidly to a first object O1a by means of screws SR1a, SR1b.

The graduation TM1 of the scale M1 is scanned in the known manner by a scanning unit AE1 in the housing G1. The scanning unit AE1 is connected through a carrier member MN1 by means of screws SR1c to a second object O1b. The carrier member MN1 extends through a longitudinal slot LS1 of housing G1. Longitudinal slot LS1 is formed by sealing lips which are not illustrated. The first object O1a may be a carriage, for example, of steel, and the second object O1b may be a bed, for example, of gray cast iron, of a processing machine which is not illustrated. The longitudinal measuring device serves to measure the relative positions of the two objects O1a, O1b or of the relative positions of a workpiece W1 mounted on carriage O1a and of a tool, not shown, on the bed O1b of the machine tool.

The length compensating element LE1 in the second fastening element BE1b is an integrated meander-shaped portion with two oppositely directed slots which extend perpendicularly of the measuring direction X. The meander-shaped portion is located between the screws SR1b and the second end G1b of the scale carrier G1 forming the housing for the scale M1 and the scanning device AE1. The two fastening elements BE1a, BE1b at the same time form the front end faces AF1a, AF1b of the two ends G1a, G1b of housing G1. The front end faces AF1a, AF1b are rigidly connected to the two ends G1a, G1b of the housing G1 in a manner which is not illustrated.

The incremental graduation TM1 of the scale M1 is a known line grating with a grating constant P (period of graduation) which is exact at the normal temperature T0 of 20° C. If processing of the workpiece W1, for example, of steel, would take place exclusively at this normal temperature T0, no measuring inaccuracies would occur during the processing and, thus, no thermally caused processing inaccuracies of the workpiece W1 would occur in spite of the different thermal expansion coefficients α(M1), α(W1) of the scale M1 of glass and the workpiece W1 of steel.

However, generally the temperatures of the machine tool continuously change relative to the normal temperature T0 during the processing of a workpiece W1, so that a temperature increase ΔT relative to the normal temperature T0 results in a relative change in length ΔL(W1)/L(W1) of the workpiece W1 of the length L(W1) at normal temperature T0 and in a relative change in length ΔL(M1)/L(M1) of the scale M1 having the same length L(M1) at normal temperature T0. Due to the greater thermal expansion coefficient $A(W1) = 11 \cdot 10^{-6} K^{-1}$ of the workpiece W1 of steel as compared to the thermal expansion coefficient $\alpha(M1) = 8 \cdot 10^{-6} K^{-1}$ of the scale M1 of glass, the relative change in length ΔL(W1)/L(W1) of the workpiece W1 is greater than the relative change in length ΔL(M1)/L(M1) of the scale M1 at a temperature increase ΔT, so that measuring inaccuracies and, thus, thermally caused processing inaccuracies may occur in the workpiece W1. These inaccuracies are unacceptable considering today's accuracy requirements.

Accordingly, it is proposed to increase the exact desired length L(M1) of the scale M1 at normal temperature T0 when the scale M1 is manufactured by a relative extension V1=ΔL(M1)/L(M1), so that the scale M1 at normal temperature now has the increased length L'(M1)=L(M1)+V1.L(M1). This relative extension V1 of the scale M1 is obtained by a corresponding increase of the exact grating constant P of the incremental graduation TM1 so that the original incremental scale M1 at the exact desired length L(M1) has a certain number of increments or graduation lines with the exact grating constant P and the increased incremental scale M1 with the increased length L'(M1) has the same number of increments or graduation lines with the increased grating constant P'.

For example, scale M1 may have a relative extension V1=30 μm/m at normal temperature T0. With scale M1 of glass having a thermal expansion coefficient $\alpha(M1) = 8 \cdot 10^{-6} K^{-1}$ and the workpiece W1 of steel having a thermal expansion $$\Delta T = \frac{V1}{\alpha(W1) - \alpha(M1)} = 10°\text{ C., i.e. a}$$

temperature TG=T0+ΔT=20° C.+10° C.=30° C., means that the extended scale M1 of glass has the same length as a non-extended scale steel or as workpiece W1 of steel. On the other hand, the scale carrier G1 of aluminum having the thermal expansion coefficient $\alpha(G1) = 23 \cdot 10^{-6} K^{-1}$ and the same length L(G1) at normal temperature T0 is longer than the desired length L(M1) of scale M1 of glass in the amount ΔT.[α(G1)-α(W1)] when the temperature is TG=30° C. For example, the temperatures during processing of the workpiece W1 may range between the normal temperature T0=20° C. as the lower limit and the temperature TG=30° C. as the upper limit.

Scale M1 rests with a first end face at the first end M1a against the first front end face AF1a of the first end G1a of housing G1 and is secured against lateral displacement by a first bracket H1a at the first end face AF1a which surrounds the first end M1a of scale M1. A first end FE1a of a spring element FE1 in the form of a helical spring connected to the second end G1b of the scale carrier G1 acts on the second end face on the second end M1b of scale M1. The second end FE1b of the spring element FE1 rests against an adjusting screw ES1 which is arranged in a threaded bore GB1 in the second end face AF1b of the second end G1b of the scale carrier G1 and is surrounded and secured against lateral displacement by a second bracket H1b fastened at the adjusting screw ES1. Thus, the second end FE1b of the spring element FE1 is connected to the second end G1b of the scale carrier G1 which has a translatory degree of freedom in measuring direction X.

The spring constant C1 of the spring element FE1 is selected so that the spring element FE1 presses on the second end face of the second end M1b of scale M1 with a force F1 which is zero at the upper temperature limit TG and is of a magnitude which compresses the extended scale M1 having the length L'(M1) by the relative extension V1, so that the compressed scale M1 has again the exact desired length L(M1) at the normal temperature T0.

The spring constant C1 of the spring element FE1 is determined as follows:

$$F1 = [\alpha(G1) - \alpha(W1)] \cdot \Delta T \cdot L(M1) \cdot C1$$

$$V1 = \frac{\Delta L(M1)}{L(M1)} = \frac{\sigma(M1)}{E(M1)} = \frac{F1}{Q(M1) \cdot E(M1)}$$

results in:
F1=V1.Q(M1).E(M1), wherein
σ(M1)=Normal compression of scale M1 within Hooke's range,
E(M1)=Modulus of elasticity of scale M1, and
Q(M1)=Cross-sectional area of scale M1.
By equating $$V1.Q(M1).E(M1) = [\alpha(G1) - \alpha(W1)].\Delta T.L(M1).C1$$

and taking $$V1 = [\alpha(W1) - \alpha(M1)].\Delta T$$

results in $$C1 = \frac{\alpha(W1) - \alpha(M1)}{\alpha(G1) - \alpha(W1)} \cdot \frac{Q(M1) \cdot E(M1)}{L(M1)}.$$

Taking a numerical example, wherein $$\alpha(M1) = 8 \cdot 10^{-6} K^{-1}$$

$$\alpha(W1) = 11 \cdot 10^{-6} K^{-1}$$

$$\alpha(G1) = 23 \cdot 10^{-6} K^{-1}$$

$$Q(M1) = 3 \cdot 20 = 60 \text{ mm}^2$$

$$E(M1) = 80 \cdot 10^3 \text{ N/mm}^2$$

$$L(M1) = 3000 \text{ mm}$$

results in a spring constant:

C1=400 N/mm.

Scale M1 has a fixed reference point relative to the first object O1a at the first end M1a where the scale M1 rests with its first end face against the first end face AF1a of the first end G1a of the scale carrier G1. The adjusting screw ES1 is used for the basic adjustment of the exact desired length L(M1) of the compressed scale M1 at normal temperature T0 and is accessible through a bore B1 in the second fastening element BE1b.

Figure 2:
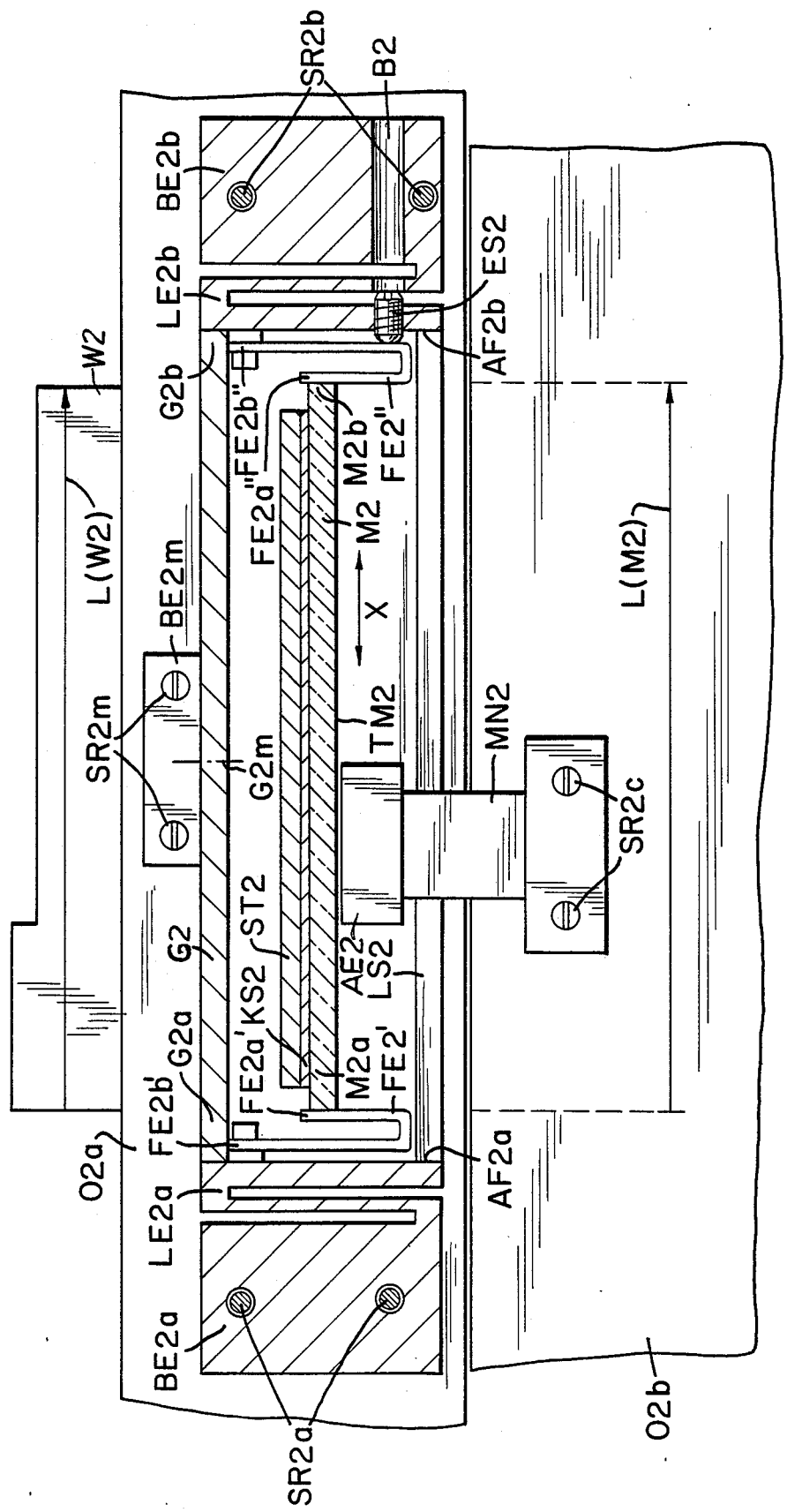
FIG. 2 is an elevational view, partly in section, of a second embodiment of an enclosed longitudinal measuring device according to the present invention.

FIG. 2 of the drawing shows a second enclosed longitudinal measuring device according to the present invention. A bending-resistant scale M2, for example, of glass, is mounted on an inner web ST2 of a scale carrier G2 so as to be slightly displaceable in measuring direction X by means of an adhesive layer KS2. The scale carrier G2 forms a housing, for example, of aluminum.

The scale carrier G2 is connected in the middle G2m thereof directly to a middle fastening element BE2m. At the first end G2a, the scale carrier G2 is connected with a translatory degree of freedom in measuring direction X through a first length compensating element LE2a with a first fastening element BE2a and the second end G2b is connected with a translatory degree of freedom in measuring direction X through a second length compensating element LE2b to a second fastening element BE2b. The middle fastening element BE2m, the first fastening element BE2a and the second fastening element BE2b, in turn, are fastened rigidly to a first object O2a by means of screws SR2m, SR2a, SR2b.

The graduation TM2 of the scale M2 is scanned in the known manner by a scanning unit AE2 in the housing G2. The scanning unit AE2 is connected through a carrier member MN2 by means of screws SR2c to a second object O2b. The carrier member MN2 extends through a longitudinal slot LS2 of housing G2. Longitudinal slot LS2 is formed by sealing lips which are not illustrated. The first object O2a may be a carriage, for example, of steel, and the second object O2b may be a bed, for example, of gray cast iron, of a processing machine which is illustrated. The longitudinal measuring device serves to measure the relative position of the two objects O2a, O2b or of the relative positions of a workpiece W2 mounted on carriage O2a and of a tool, not shown, on the bed O2b of the machine tool.

The two length compensating elements LE2a, LE2b in the two fastening elements BE2a, BE2b are integrated meander-shaped portions which with two oppositely directed slots which extend perpendicularly of the measuring direction X. The meander-shaped portions are located between the screws SR2a, SR2b and the two ends G2a, G2b, respectively, of the scale carrier G2 forming the housing for the scale M2 and the scanning device AE2. The first fastening element BE2a and the second fastening element BE2b at the same time form the front end faces AF2a, AF2b of the two ends G2a, G2b of the housing G2. The front end faces AF2a, AF2b are rigidly connected to the two ends G2a, G2b of the housing G2 in a manner which is not illustrated.

It is again proposed to increase the exact desired L(M2) of the scale M2 at normal temperature T0 when the scale M2 is manufactured by a relative extension $V2 = \Delta L(M2)/L(M2)$ so that the scale M2 at normal temperature now has the increased length $L'(M2) = L(M2) + V2 \cdot L(M2)$. A first end FE2a' of a first spring element FE2' in the form of a U-shaped plate spring presses on the first end face of the first end M2a of the scale M2. The first spring element FE2' is connected with its second end FE2b' to the first front end face AF2a of the first end G2a of the scale carrier G2. A first end FE2a" of a second spring element FE2" in the form of a U-shaped plate spring presses on the second end face of the second end M2b of the scale M2. The second spring element FE2" is fastened with its second end FE2b" to the second front end face AF2b of the second end G2b of the scale carrier G2. Thus, the two spring elements FE2', FE2" are connected to the two ends G2a, G2b of the scale carrier G2 which each have a translatory degree of freedom in measuring direction X.

The spring constant C2 of the two equivalent spring elements FE2', FE2" is selected so that the spring elements FE2', FE2" press on the two end faces of the two ends M2a, M2b of the scale M2 with a spring force F2 which is zero at the upper limit temperature TG and, at normal temperature T0 = 20° C., has a magnitude for compressing the extended scale M2 having the length L'(M2) by the relative extension V2, so that the compressed scale M2 has again the exact desired length L(M2) at normal temperature T0.

Since scale M2 is connected to the scale carrier G2 by means of a uniformly thick adhesive layer KS2, the scale M2 can expand symmetrically relative to its middle toward both sides in the unbiased state when temperature increases occur, because the elastic adhesive layer KS2 permits slight displacements of the scale M2 in the measuring direction X. Thus, scale M2 has a fixed reference point in its middle relative to the scale carrier G2 and, due to the rigid fastening of the scale carrier G2 in the middle thereof by means of the middle fastening element BE2m at the first object O2a, has the same fixed reference point relative to the first object O2a.

Utilizing the above derivation, the following is obtained for the spring constant C2:

$$C2 = \frac{\alpha(W2) - \alpha(M2)}{\alpha(G2) - \alpha(W2)} \cdot \frac{Q(M2) \cdot E(M2) \cdot 2}{L(M2)} \; ;$$

and when using the above numerical examples:

C2 = 800 N/mm.

In the above equation for the spring constant C2, L(M2) was replaced by L(M2)/2 because each spring element FE2', FE2" corresponds to half the length of the scale M2.

An adjusting screw ES2 acts on the second spring element FE2". Adjustment screw ES2 is arranged in a threaded bore GB2 of the second fastening element BE2b and is accessible through a bore B2. The adjusting screw ES2 serves for the basic adjustment of the exact desired length L(M2) of the compressed scale M2 at normal temperature T0.

In accordance with FIG. 1, the spring constant C1 of the spring element FE1 depends on the total desired length L(M1) of the scale M1 and, in accordance with FIG. 2, the spring constant C2 of the two spring elements FE2', FE2" depends on half the desired length L(M2)/2 of the scale M2: $C1 \sim 1/L(M1)$, $C2 \sim 2/L(M2)$. However, in processing machines, longitudinal measuring devices are use whose scales M have different length L(M) depending upon the purpose for which they are used, so that a plurality of spring elements FE having different spring constants C are required.

Figure 3:
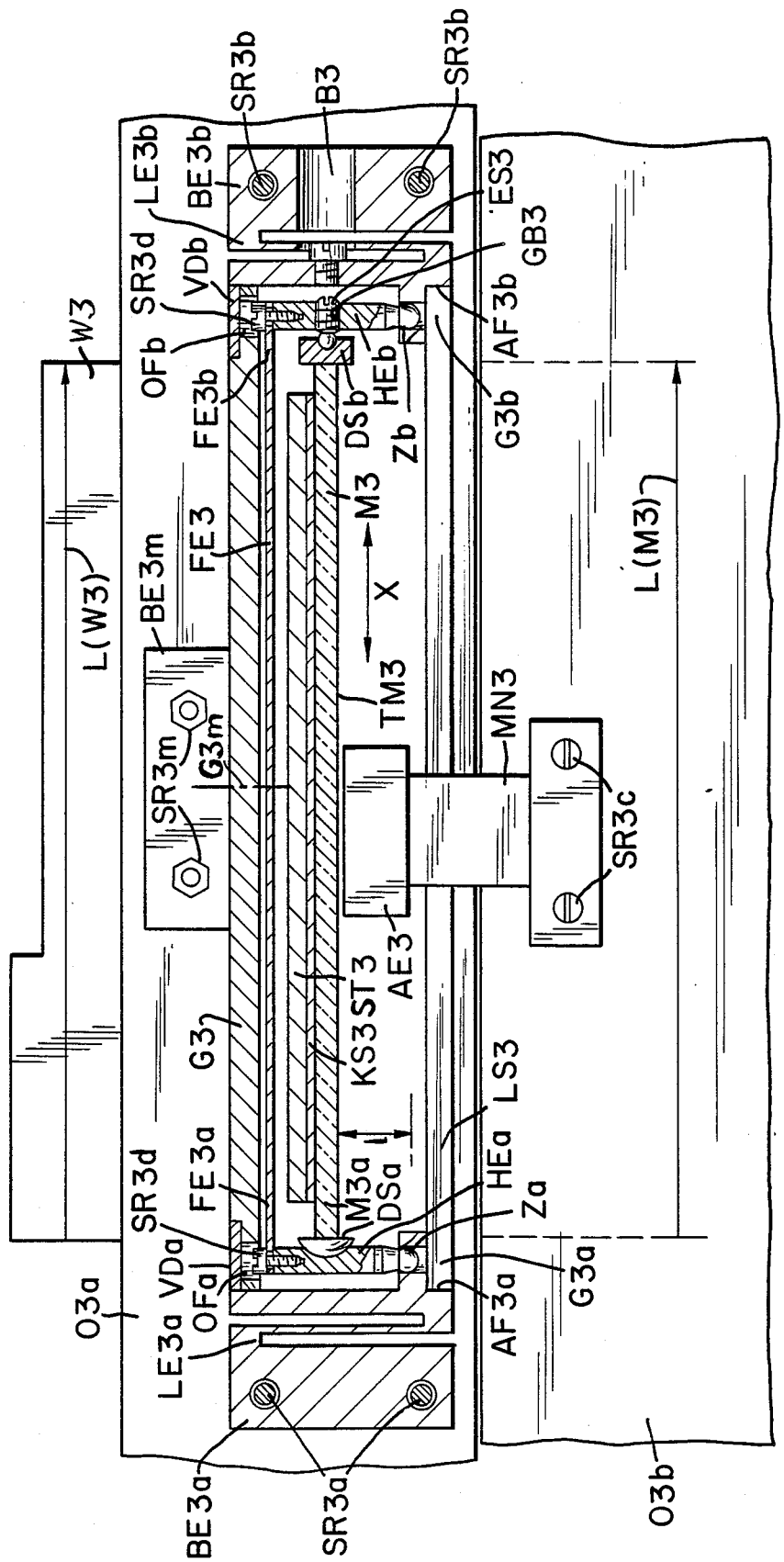
FIG. 3 is an elevational view, partly in section, of a third embodiment of an enclosed longitudinal measuring device according to the present invention.

Therefore, FIG. 3 of the drawing shows a third enclosed longitudinal measuring device according to the present invention. A bending-resistant scale M3, for example, of glass, is mounted on an inner web ST3 of a scale carrier G3 so as to be slightly displaceable in measuring direction X by means of an adhesive layer KS3. The scale carrier G3 forms a housing, for example, of aluminum. The scale carrier G3 is connected in the middle G3m thereof directly to a middle fastening element BE3m. A first end G3a of the scale carrier G3 is connected with a translatory degree of freedom in measuring direction X through a first length compensating element LE3a to a first fastening element BE3a and a second end G3b of the scale carrier G3 is connected with a translatory degree of freedom in measuring direction X through a second length compensating element LE3b to a second fastening element BE3b. The middle fastening element BE3m, the first fastening element BE3a and the second fastening element BE3b, in turn, are fastened rigidly to a first object O3a by means of screws SR3m, SR3a, SR3b.

The graduations TM3 of the scale M3 is scanned in the known manner by a scanning unit AE3 in the housing G3. The scanning unit AE3 is connected through a carrier member MN3 by means of screws SR3c to a second object O3b. The carrier member MN3 extends through a longitudinal slot LS3 of housing G3. Longitudinal slot LS3 is formed by sealing lips which are not illustrated. The first object O3a may be a carriage, for example, of steel, and the second object O3b may be a spread, for example, of gray cast iron, of a processing machine which is not illustrated. The longitudinal measuring device serves to measure the relative position by means of the two objects O3a, O3b or of the relative positions of the two objects O3a, O3b or of the relative positions of a workpiece W3 mounted on carriage O3a and of a tool, not shown, on the bed O3b of the machine tool.

The two length compensating elements LE3a, LE3b in the fastening elements BE3a, BE3b are integrated meander-shaped portions with two oppositely directed slots which extend perpendicularly of the measuring direction X. The meander-shaped portions are located between the screws SR3a, SR3b and the two ends G3a, G3b of the scale carrier G3 forming the housing of the scale M3 and the scanning device AE3. The first fastening element BE3a and the second fastening element BE3b at the same time form the front faces AF3a, AF3b of the two ends G3a, G3b of the housing G3. The front end faces AF3a, AF3b are rigidly connected to the two ends G3a, G3b of the housing G3 in a manner which is not illustrated.

The exact desired length L(M3) of the scale M3 at normal temperature T0 when the scale 1 is manufactured is again increased by a relative extension $V3 = \Delta L(M3)/L(M3)$, so that the scale M3 at normal temperature T0 has the increased length $L'(M3) = L(M3) + V3 \cdot L(M3)$. A first bending-resistant lever element HEa is arranged on the first end G3a of housing G3 and a second bending-resistant lever element HEb is arranged on the second end G3b of housing G3. The lever elements HEa, HEb are arranged so as to extend perpendicularly of the measuring direction X. An end of the first lever element HEa is rotatably mounted in a first pin Za extending from the first front end face AF3a; in the same manner, an end of the second lever element HEb is rotatably supported in a second pin Zb extending from the second front end face AF3b. The two ends FE3a, FE3b of a spring element FE3 are connected by means of screws SR3d to the two free ends of the two lever elements HEa, HEb. The screws SR3d are accessible through two openings OFa, OFb in the two ends G3a, G3b of housing G3. The openings OFa, OFb are closed by VDa, VDb. A first pressure member DSa is arranged in an articulated manner in the first lever element HEa between the two ends thereof. The first pressure member DSa presses on the first end face of the first end M3a of scale M3. A second pressure member DSb presses on the second end M3b of the scale M3. The second pressure member DSb is fastened in an articulated manner on an adjusting screw ES3 which is arranged in a threaded bore GB3 of the second lever element HEb between the two ends thereof and is accessible through a bore B3 in the second fastening element BE3b. Thus, the two ends FE3a, FE3b of spring element FE3 are connected through the two lever elements HEa, HEb to the two ends G3a, G3b of the scale carrier G3 each with a translatory degree of freedom in measuring direction X.

The spring element FE3 is a tension spring in the form of a metal strip or a metal section. The length of the spring element FE3 corresponds approximately to the desired length L(M3) of the scale M3 and the spring constant C3 of the spring element FE3 depends in the same manner on the desired length L(M3) of scale M3: $C3 \sim 1/L(M3)$. The spring constant C3 of the spring element FE3 is selected so that the spring element FE3 presses through the two lever elements HEa, HEb and the two pressure members DSa, DSb on the two end faces at the two ends M3a, M3b of the scale M3 with a spring force F3 which is zero at the upper limit temperature TG and, at the normal temperature T0=20° C., has a magnitude for compressing the extended scale M3 having the length L'(M3) by the relative extension V3, so that the compressed scale M3 again has the exact desired length L(M3) at normal temperature T0.

Since the scale M3 is connected to the scale carrier G3 by means of a uniformly thick adhesive layer KS3, scale M3 stands symmetrically relative to its metal toward both sides in the unloaded state when temperature increases occur, because the elastic adhesive layer KS3 permits slight displacement of the scale M3 in measuring direction X. Thus, scale M3 has in the middle thereof a fixed reference point relative to the scale carrier G3 and, due to the rigid fastening of the scale carrier G3 in the middle thereof by means of the middle fastening element BE3m at the first object O3a, has the same fixed reference point relative to the first object O3a. The adjusting screw ES3 serves for the basic adjustment of the exact desired length L(M3) of the compressed scale M3 at normal temperature T0.

Utilizing the above derivation, the following spring constant C3 is obtained:

$$C3 = \frac{\alpha(W3) - \alpha(M3)}{\alpha(G3) - \alpha(W3)} \cdot \frac{Q(M3) \cdot E(M3) \cdot 2}{L(M3)};$$

and with the same numerical example used above:

C3 = 800 N/MM.

The first lever arm of the two lever elements HEa, HEb between the pivots in the ends G3a, G3b of the scale carrier G3 and the compact points with the scale M3 has the first lever arm length 1 and the second lever arm of the two lever elements HEa, HEb between the contact points with the scale M3 and the contact points of the spring elements FE3 has the second lever arm length i . 1, wherein i represents the lever ratio.

The lever ratio i of the two lever elements HEa, HEb, the modulus of elasticity E(FE3) of the spring element FE3, the modulus of elasticity E(M3) of the scale M3, the modulus of elasticity E(G3) of the scale carrier G3, the cross-sectional area Q(FE3) of the spring element FE3, the sectional area Q(M3) of scale M3 and the cross-sectional area Q(G3) of the scale carrier G3 are to be selected such that the thermal expansion coefficient α(M3) of the scale M3 of glass is raised by a certain amount Δα(M3) to the thermal expansion coefficient α(W3) of the workpiece W3 of steel:

$$\alpha(M3) + \Delta\alpha(M3) = \alpha(W3).$$

the amount Δα(M3) by which the thermal expansion coefficient α(M3) of the scale M3 is raised results in:

$$\Delta\alpha(M3) = \frac{\frac{\alpha(FE3)}{i} + \frac{i-1}{i}\alpha(G3) - \alpha(M3)}{1 + \frac{1}{i^2} \cdot \frac{Q(M3) \cdot E(M3)}{Q(FE3) \cdot E(FE3)} + \left(\frac{i-1}{i}\right)^2 \cdot \frac{Q(M3) E(M3)}{Q(G3) E(G3)}}$$

Since the scale carrier G3 generally is of a substantially stiffer material than the scale M3, the equation is simplified to:

$$\Delta\alpha(M3) = \frac{\frac{\alpha(FE3)}{i} + \frac{i-1}{i}\alpha(G3) - \alpha(M3)}{1 + \frac{1}{i^2} \cdot \frac{Q(M3) E(M3)}{Q(FE3) E(FE3)}}$$

Utilizing the following numerical example $$\alpha(FE3) = 11 \cdot 10^{-6} K^{-1}$$

$$\alpha(M3) = 8 \cdot 10^{-6} K^{-1}$$

$$\alpha(G3) = 23 \cdot 10 - 6_K - 1$$

$$Q(M3)/Q(FE3) = 6$$

$$E(FE3)/E(M3) = 3$$

$$i = 1.5$$

results in:

$$\Delta\alpha(M3) = 3.4 \cdot 10^{-6} K^{-1}$$

$$\alpha(M3) + \Delta\alpha(M3) = 11.4 \cdot 10^{-6} K^{-1} = \alpha(W3) = 11 \cdot 10^{-6} \cdot K^{-1}$$

Figure 4:
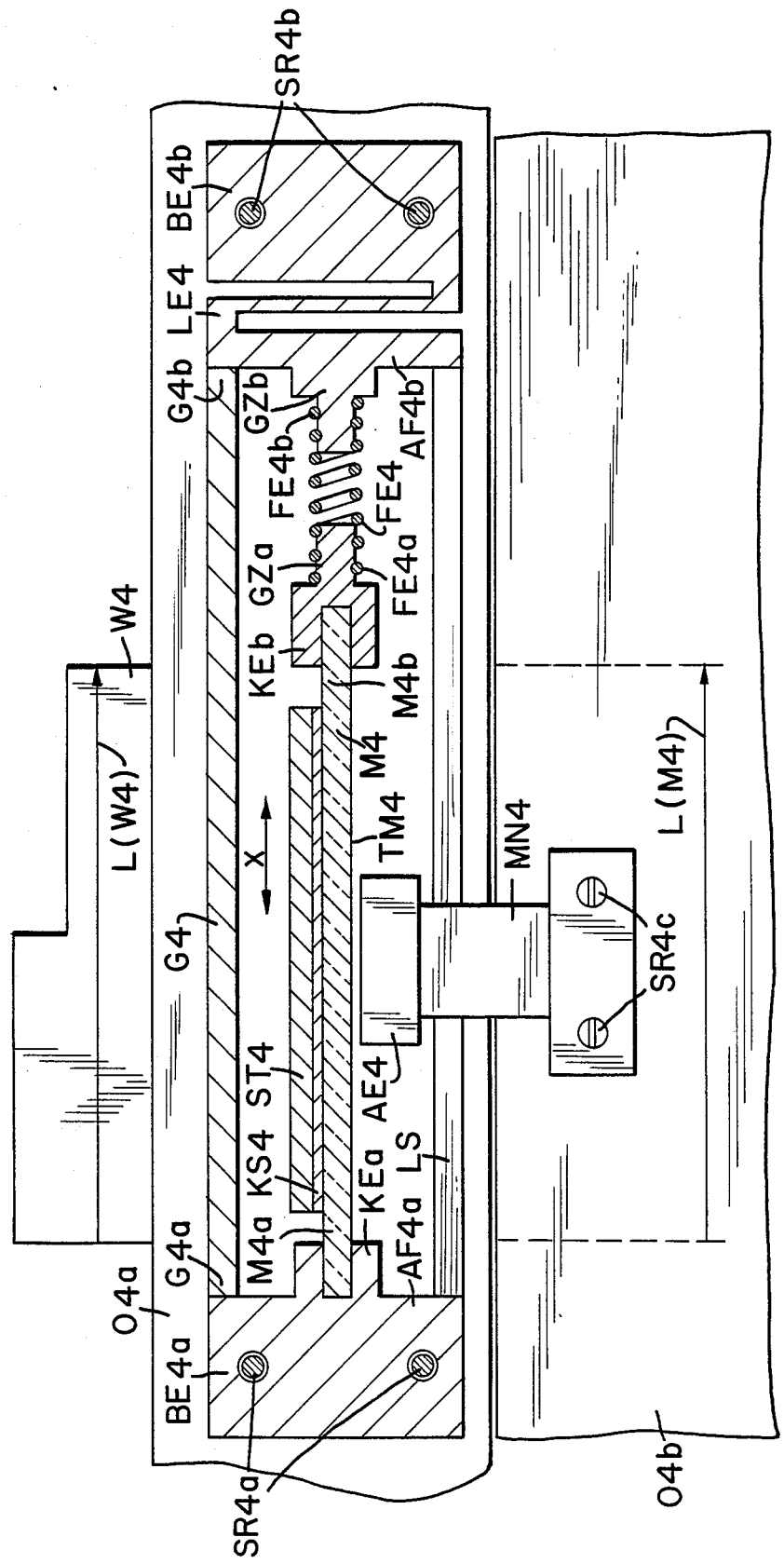
FIG. 4 is an elevational view, partly in section, of a fourth embodiment of an enclosed longitudinal measuring device according to the present invention.

FIG. 4 of the drawing shows a fourth enclosed longitudinal measuring device according to the present invention. A bending-resistant scale M4, for example, of glass, is mounted on an inner web ST4 of a scale carrier G4 so as to be slightly displaceable in measuring direction X by means of an adhesive layer KS4. The scale carrier G4 forms a housing, for example, of aluminum. The scale carrier G4 is connected at the first end G4a directly to a first fastening element BE4a and at the second end G4b to a second fastening element BE4b through a length compensating element LE4 with a translatory degree of freedom in measuring direction X. The two fastening elements BE4a, BE4b, in turn, are fastened rigidly to a first object O4a by means of screws SR4a, SR4b.

The graduation TM4 of the scale M4 is scanned in the known manner by a scanning unit AE4 in housing G4. The scanning unit AE4 is connected through a carrier member MN4 by means of screws SR4c to a second object O4b. The carrier member MN4 extends through a longitudinal slot LS4 of a housing G4. Longitudinal slot LS4 is formed by sealing lips which are not illustrated. The first object O4a may be a carriage, for example, of steel, and the second object O4b may be a bed, for example, of gray cast iron, of a processing machine which is not illustrated. The longitudinal measuring device serves to measure the relative positions of the two objects O4a, O4b or of the relative positions of a workpiece W for mounted-on carriage O4a and of a tool, not shown, on the bed O4b of the machine tool.

The length compensating element LE4 in the second fastening element BE4b is an integrated meander-shaped portion with two oppositely directed slots which extend perpendicularly of the measuring direction X. The meander-shaped portion is located between the screws SR4b and the second end G4b of the scale carrier G4 forming the housing for the scale M4 and the scanning device AE4. The two fastening elements BE4a, BE4b at the same time form the front end faces AF4a, AF4b of the two ends G4a, G4b of housing G4. The front end faces AF4a, AF4b are rigidly connected to the two ends G4a, G4b of the housing G4 in a manner which is not illustrated.

The incremental graduation TM4 of the scale M4 is a known line grating with a grating constant P (of graduation) which is exact at the normal temperature T0 of 20° C. If processing of the workpiece W4, for example, of steel, would take place exclusively at this normal temperature T0, no measuring inaccuracies would occur during the processing, and thus, no thermally closed processing inaccuracies of the workpiece W4 would occur in spite of the different thermal expansion coefficients α(M4), α(W4) of the scale M4 of glass and the workpiece W4 of steel.

However, generally the temperatures of the machine tool continues to change relative to the normal temperature T0 during the processing of a workpiece W4, so that a temperature increase ΔT relative to the normal temperature T0 results in a relative changing length ΔL(W4)/L(W4) of the workpiece W4 of the length L(W4) at normal temperature T0 and in a relative changing length ΔL(M4)/L(M4) of the scale M4 having the same length L(M4) at normal temperature T0. Due to the greater thermal expansion coefficient α(W4)=11.10$^{-6}$K$^{-1}$ of the workpiece W4 of steel as compared to the thermal expansion coefficient α(M4)=8.10$^{-6}$K$^{-1}$ of the scale M4 of glass, the relative change in length ΔL(W4)/L(W4) of the workpiece W4 is greater than the relative change in length ΔL(M4)/L(M4) of the scale M4 at a temperature increase ΔT, so that measuring inaccuracies and, thus, thermally caused processing inaccuracies may occur in the workpiece W4. These inaccuracies are unacceptable considering today's accuracy requirements.

At normal temperature T0, scale M4 has the exact desired length L(M4). Scale M4 is fastened with its first end M4a by means of a first clamping element KEa to the first front end face AF4a of the first end G4a of housing G4. The second end M4b of scale M4 is fastened in a second clamping element KEb which is connected through a spring element FE4 in the form of helical spring to the second end G4b of the scale carrier G4. A first end FE4a is screwed onto a first threaded projection GZa of the second clamping element KEb and the second end FE4b of the spring element FE4 is screwed onto a second threaded projection GZb which is provided on the second end face AF4b of the second fastening element BE4b. Thus, the second end FE4b of the spring element FE4 is connected to the second end G4b of the scale carrier G4 which has a translatory degree of freedom in measuring direction X.

The spring constant C4 of spring element FE4 is selected so that the scale M4 has the exact desired length L(M4) at normal temperature T0 and, when temperature changes ΔT occur, the relative change in length ΔL(M4)/L(M4) of the scale M4 is equal to the relative change in length ΔL(W4)/L(W4) of the workpiece W4.

The present invention can be successfully utilized in photoelectric, magnetic, capacitive and inductive, as well as in incremental and absolute position measuring devices.

While specific embodiments of the invention have been shown and described in detail to illustrate the application of the inventive principles, it will be understood that the invention may be embodied otherwise without departing from such principles.

I claim:

1. In a position measuring device for measuring the relative positions of a first and a second object, wherein the first and second objects to be measured are machine components of a processing or working machine or a measuring machine for tools, the position measuring device including a scale with a graduation connected to the first object, the graduation being scanned by a scanning unit connected to the second object, the scale being arranged on a scale carrier so as to be slightly displaceable in a measuring direction, the scale carrier being connected with both ends thereof to fastening elements which are rigidly connected to the first object, a workpiece being mounted on the first object, the improvement comprising the scale carrier being connected at least at one end thereof to one of the fastening elements with a translatory degree of freedom in measuring direction when the scale, the scale carrier and the workpiece have different thermal expansion, a spring element for biasing the scale at least at one end thereof, the spring element being connected to the translatory movable end of the scale carrier, the spring constant of the spring element being selected so that when temperature changes occur the relative change in length of the scale is equal to the relative change in length of the workpiece.

2. The measuring device according to claim 1, wherein the scale has an exact desired length at a normal temperature.

3. The measuring device according to claim 1, wherein the scale has a relative extention which exceeds an exact desired length of the scale at a normal temperature.

4. The measuring device according to claim 1, wherein the spring element is a helical spring.

5. The measuring device according to claim 1, wherein the spring element is a U-shaped plate spring.

6. The measuring device according to claim 1, wherein both ends of the scale carrier are connected to the fastening elements with a translatory degree of freedom in measuring direction, the spring element being a tension spring, the scale having two ends, a lever element each rotatably mounted in the two translatory movable ends of the scale carrier, the tension spring acting on the two ends of the scale through the lever elements.

7. The measuring device according to claim 6, wherein the spring element is a metal band.

8. The measuring device according to claim 1, comprising an adjusting screw acting on the spring element.

9. The measuring device according to claim 1, comprising a length compensating element for connecting the translatory movable end of the scale carrier to the respective fastening element.

10. The measuring device according to claim 9, wherein the length compensating element is integrated in the fastening element.

* * * * *